United States Patent
Me et al.

(10) Patent No.: US 11,221,845 B2
(45) Date of Patent: Jan. 11, 2022

(54) VISUAL MEDIA METADATA-BASED SOFTWARE CONFIGURATION USING DESIGN SYSTEMS

(71) Applicant: salesforce.com, inc., San Francisco, CA (US)

(72) Inventors: Kevin Me, Toronto (CA); Michael Brosseau, Vancouver (CA)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/521,828

(22) Filed: Jul. 25, 2019

(65) Prior Publication Data

US 2021/0026624 A1    Jan. 28, 2021

(51) Int. Cl.
| | |
|---|---|
| *G06F 8/71* | (2018.01) |
| *G06K 9/62* | (2006.01) |
| *G06F 8/20* | (2018.01) |
| *G06F 16/22* | (2019.01) |
| *G06N 20/00* | (2019.01) |
| *G06F 9/451* | (2018.01) |

(52) U.S. Cl.
CPC ............. *G06F 8/71* (2013.01); *G06F 8/20* (2013.01); *G06F 9/451* (2018.02); *G06F 16/22* (2019.01); *G06K 9/62* (2013.01); *G06N 20/00* (2019.01); *G06K 2209/01* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Amit, "Workflow vs Process: What's the Difference?", 2020, Tallyfy at https://tallyfy.com/workflow-process/ (Year: 2020).*

(Continued)

*Primary Examiner* — Hossain M Morshed
(74) *Attorney, Agent, or Firm* — Kwan & Olynick LLP

(57) ABSTRACT

In accordance with embodiments, there are provided mechanisms and methods for facilitating visual media metadata-based software configuration using design systems according to one embodiment. In one embodiment and by way of example, a method includes identifying a visual image of contents including a workflow of transactions to be performed by a software application associated with a software design system, where the visual image represents a digital photograph captured by a camera. The method may further include translating the contents into metadata compatible with the software design system, generating a process flow corresponding to the workflow and based on the metadata, and configuring the software application based on the process flow such that one or more objects of the software application are augmented based on the process flow.

15 Claims, 9 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,073,777 B2 | 12/2011 | Barry et al. |
| 8,724,007 B2* | 5/2014 | Chen ...................... H04N 5/247 348/345 |
| 8,855,620 B2* | 10/2014 | Sievers ................... H04L 67/04 455/419 |
| 10,001,986 B1* | 6/2018 | De Gaetano ............ G06F 8/658 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0212855 A1* | 9/2006 | Bournas ................ G06Q 10/06 717/140 |
| 2007/0124507 A1 | 5/2007 | Gurram et al. |
| 2008/0191008 A1* | 8/2008 | Manfredi ............... G06Q 30/06 235/379 |
| 2009/0044235 A1* | 2/2009 | Davidson ........... H04N 21/4828 725/87 |
| 2009/0177744 A1 | 7/2009 | Marlow et al. |
| 2010/0205090 A1* | 8/2010 | Fellerman .............. G06Q 20/04 705/40 |
| 2011/0238649 A1* | 9/2011 | Jenkins ................... G06F 16/93 707/706 |
| 2012/0213429 A1* | 8/2012 | Vasudevan ......... G06K 9/00476 382/162 |
| 2014/0019515 A1* | 1/2014 | Bhattacharyya ...... G06F 16/907 709/203 |
| 2017/0047067 A1 | 2/2017 | Geldbach et al. |
| 2018/0032806 A1* | 2/2018 | Prebble .............. G06K 9/00476 |
| 2019/0158274 A1* | 5/2019 | Tormasov .............. G06N 20/00 |
| 2021/0026624 A1* | 1/2021 | Me ........................... G06F 8/71 |

OTHER PUBLICATIONS

Vasudevan, "Flowchart Knowledge Extraction on Image Processing", 2008, IEEE (Year: 2008).*

Hass, "Configuration Management Principles and Practice", 2002, Addison-Wesley Professional. Part of the Agile Software Development Series series. (Year: 2002).*

Non-Final Office Action for U.S. Appl. No. 16/521,842 dated Aug. 18, 2020, 24 pages.

Final Office Action for U.S. Appl. No. 16/521,842 dated Mar. 9, 2021, 20 pages.

* cited by examiner

VISUAL MEDIA METADATA-BASED SOFTWARE CONFIGURATION USING DESIGN SYSTEMS

RELATED APPLICATIONS

This application relates to commonly assigned and concurrently filed U.S. patent application, entitled AUDITORY MEDIA METADATA-BASED SOFTWARE CONFIGURATION USING DESIGN SYSTEMS, by Kevin Me, et al., filed Jul. 25, 2019.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate visual media metadata-based software configuration using design systems.

BACKGROUND

Conventional techniques put users through struggles of dealing with complex and tedious nature of configuring business software, where a developer needs to have the expertise and patience to navigate through a myriad of configuration screens. Such techniques are prone to human errors and therefore often require multiple attempts before the results are entirely error-free. Further, such conventional techniques restrict developers to work with certain design systems, where the developers are expected to spend endless hours to update cross-referencing design systems with the existing systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
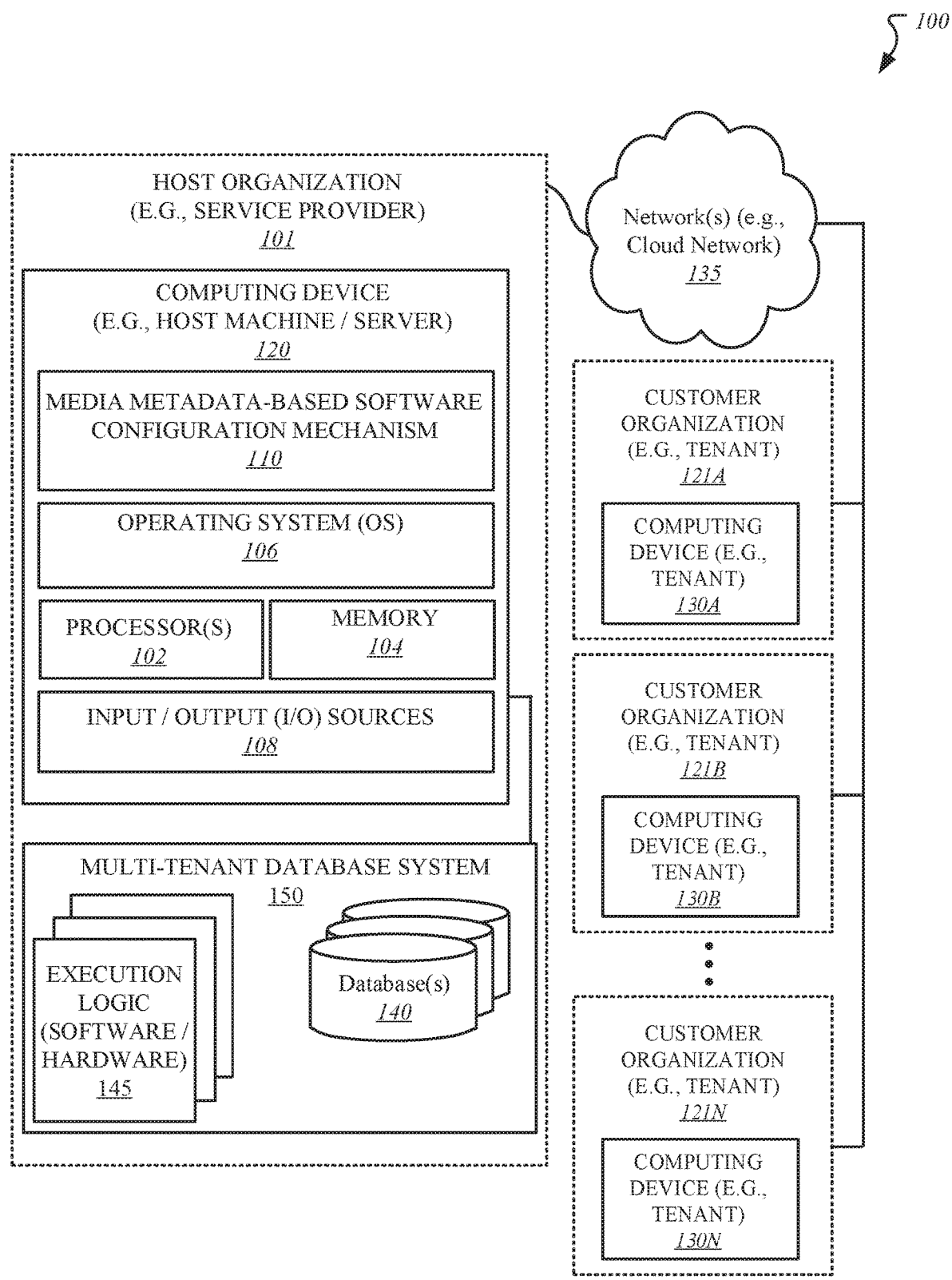
FIG. 1 illustrates a system having a computing device employing a media metadata-based software configuration mechanism according to one embodiment.

In accordance with embodiments, there are provided mechanisms and methods for facilitating visual media metadata-based software configuration using design systems according to one embodiment. In one embodiment and by way of example, a method includes identifying a visual image of contents including a workflow of transactions to be performed by a software application associated with a software design system, where the visual image represents a digital photograph captured by a camera. The method may further include translating the contents into metadata compatible with the software design system, generating a process flow corresponding to the workflow and based on the metadata, and configuring the software application based on the process flow such that one or more objects of the software application are augmented based on the process flow.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for capturing digital image of a potential data schema, such as flowchart, transaction sequence, business plan, etc., from any surface (such as paper, whiteboard, etc.) and using the contents of the digital image for configuration (e.g., generation, modification, etc.) of software, such as business applications. Further, this novel technique is agnostic to any number and type of design systems and therefore this novel technique may assist a developer with software configuration using one or multiple design systems regardless of their platforms, architecture, programming limitations, or service providers.

Embodiments provide for a novel technique for capturing a digital auditory message describing a potential data schema, such as flowchart, transaction sequence, business plan, etc., in any form (such as human voice, machine sound, etc.) and using the contents of the digital auditory message for configuration (e.g., generation, modification, etc.) of software, such as business applications. Further, this novel technique is agnostic to any number and type of design systems and therefore this novel technique may assist a developer with software configuration using one or multiple design systems regardless of their platforms, architecture, programming limitations, or service providers.

For brevity, clarify, and ease of understanding, visual images and audio recordings may be collectively referred to as "audio/visual" or simply "media". For example, any metadata that is extracted from visual images (e.g., photographs, video streams, etc.) and/or audio recordings (e.g., human speech, machine recordings, etc.) may be referred to as media-based metadata that may then be used for configuration of software (e.g., business software).

The novel techniques described herein can be further utilized to support updates and increase efficiency with respect to business software and design systems. For example, Salesforce Lightning Design System (SLDS) refers to a styling application program interface (API) that is updated periodically, while the use of any of the novel techniques described herein with SLDS embodiments may result in reduction of burden on the developer to match tokens during development, can reduce the size of the Cascading Style Sheet (CSS) bundle, which can improve performance, and can provide support for user interface (UI) requirements (e.g., theming, densification). Within this structure SLDS tokens can be utilized to store/communicate design attributes for CSS (or other) files.

In one embodiment, one or more of these novel techniques may further serve to reduce design complexity. For example, each change from a digital picture or extracted from a digital audio can be scanned against any design system for relevant information. For example, an existing implementation can be used to one or more markup templates, JavaScript (JS), and/or style declaration(s), etc., through digital images and/or audios. This image or audio offering the component bundle can be translated into, for example, an abstract syntax tree (AST) or other structure. From there, a component tree can be constructed and analyzed, including static analysis, regular expression analysis, and/or structure hierarchy analysis. In one embodiment, recommendations and relevant flows can be generated before any constant integration (CI) and/or automation functionality is triggered.

In various embodiments described herein, static values within CSS files are tokenized. Thus, in SLDS embodiments, SLDS tokens are updated with new releases/updates, where any corresponding values (e.g., static values) in bundled CSS files can be consistently and automatically updated, which can function to streamline the update process. Similarly, utility classes in Hypertext Markup Language (HTML) and can be tokenized within the bundles.

In various embodiments, design tokens include visual design atoms of the design system. Specifically, tokens are named entities that store visual design attributes. Further, such tokens can be used in place of hard-coded values (e.g., hex values for color or pixel values for spacing) in order to maintain a scalable and consistent visual system for user interface (UI) development.

In various embodiments, the novel tools described herein can function to analyze CSS, JS and/or HTML files to find one or more of: static values and incorrect token usage in the CSS files; invalid utility classes in the JS and/or HTML files; and/or provide recommendations to fix identified errors.

It is contemplated and to be noted that embodiments are not limited to certain types of queries or query languages, such as Salesforce Object Query Language (SOQL), Salesforce Object Search Language (SOSL), Sequential Query Language (SQL), etc. However, for the sake of brevity clarify, SQL may be used as an example throughout this document, but that embodiments are not limited as such.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a media metadata-based software configuration mechanism ("media software mechanism") 110 according to one embodiment. In one embodiment, media software mechanism 110 provides for a novel technique for facilitating visual and/or auditory metadata-based configuration of business software using various design systems.

As illustrated, in one embodiment, computing device 120, being part of host organization 101 (e.g., service provider, such as Salesforce.com®), represents or includes a server computer acting as a host machine for media software mechanism 110 for facilitating smart capture and use of metadata through visual and/or auditory media for dynamic generation and/or configuration of business software with various design systems in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of media software mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
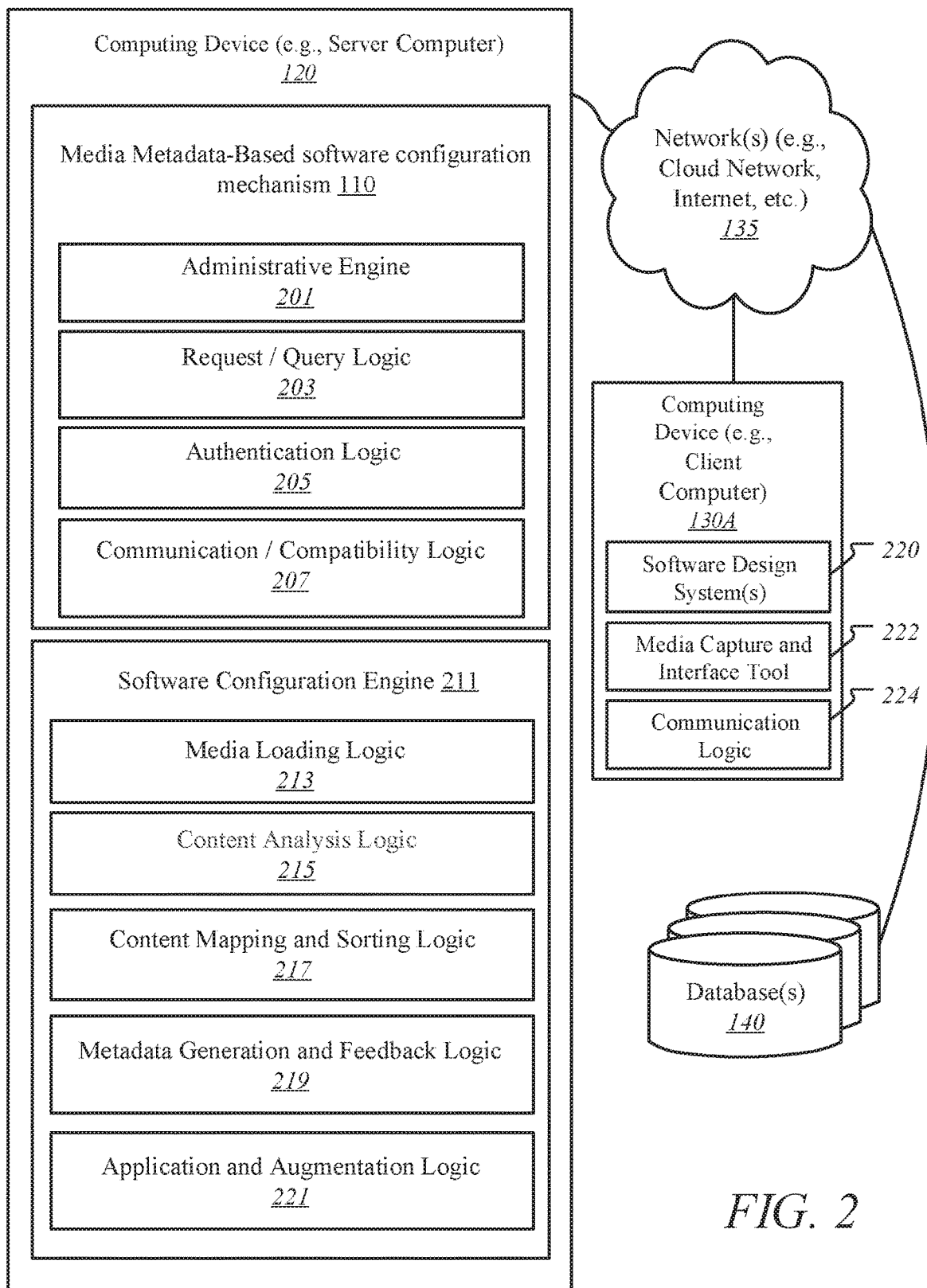
FIG. 2 illustrates a media metadata-based software configuration mechanism according to one embodiment.

FIG. 2 illustrates media metadata-based software configuration mechanism 110 of FIG. 1 according to one embodiment. In one embodiment, media software mechanism 110 provides for visual and/or auditory metadata-based configuration of business software using various design systems, where media software mechanism 110 includes any number and type of components, such as administration engine 201 having (without limitation): request/query logic 203; authentication logic 205; and communication/compatibility logic 207. Similarly, media software mechanism 110 may further include software configuration engine 211 including (without limitations): media uploading logic 213; content analysis logic 215; content mapping and sorting logic 217; metadata generation and feedback logic 219; and application and augmentation logic 219.

In one embodiment, computing device 120 may serve as a service provider core (e.g., Salesforce.com® core) for hosting and maintaining media software mechanism 110 and be in communication with one or more database(s) 140, client computer 130A, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, server computing device serving as media-extracted metadata-based software configuration device ("media-based software configuration device") 120 is shown in communication with client computing device 130A over one or more network(s) 135 (e.g., cloud network, Internet, etc.). In one embodiment, client devices, such as client device 130A, may be provided a user interface as facilitated by interconnection and interface logic 221, where the user interface may serve as a layer above and associated with API(s) provided by a service provider (e.g., Salesforce.com®). As illustrated, client device 130A is shown as employing design system(s) 220, media capture and interface tool ("media tool") 222, and communication logic 224.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "query", "data", "integrated development environment", "generic", "IDE", "extension", "design system", "metadata", "metadata mapping", "database", "application", "detecting", "gathering", "bundling", "identifying", "integrating", "generating", "associating", "diagnosing", "classifying", "transmitting", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from the client device 130A. The request interface may further support the return of response packets or other replies and responses in an outgoing direction from computing device 120 to one or more client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device 130A.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client device 130A, over one or more communication mediums, such as network(s) 140.

As previously described, there are not design systems-related extensions available today to lessen the complications associated with working with varying and incompatible design systems. Consequently, any developers working with such design systems spend endless hours updating cross-referencing design systems with their existing systems. For example, at times, a developer may need to simultaneously work with multiple design systems for their project, making their task that much difficult and complex.

Embodiments provide for a novel technique for capturing and uploading media (e.g., digital images, digital audio, etc.) that are the analyzed and processed and any metadata extracted from the media is then used for configuration of software, such as business software.

As previously discussed, business software users have traditionally struggled with the complexity and tedious nature of configuring business software. Enterprise software platforms are known to have a myriad of configuration screens which can be rather difficult to navigate and use. Further, using conventional techniques, translating planning work, such as drawn business process diagrams or plans, etc., into configuring business software can be extremely inefficient and often inaccurate.

Embodiments provide for a novel technique to enable business users of various service provider platforms to be able to configure the software using any software design system by simply converting digital media (such as photographs, audio recordings, etc.), etc. This novel technique allows for users (e.g., software developers, system administrators, etc.) to perform configuration software and/or their software design systems with ease, efficiency, agility, etc., for better productivity and less cost.

For example, several service providers (e.g., Salesforce.com®) have created and offered leading edge solutions to improve the quality of sales, services, marketing, other end-user services through their business platforms; however, administration of such platforms (though getting increasingly better with time) can be very tedious for even the simplest of tasks. For example, creating even a single new object for a software application could take 5 or more clicks and require navigating through multiple screens, etc., each of which may take several seconds to load and process.

With respect to the media involving visual images, as facilitated by media software mechanism 110, digital photos or videos of flowcharts, business plans, etc., may be put through a novel machine learning-based intelligence, as facilitated by software configuration engine 211, to generate or modify business software and/or design systems, including ross-referencing between various design systems. In some embodiments, this built-in intelligence may be used to warn developers of incorrect processes and recommend/guide them to use the correct ones.

With respect to the media involving auditory messages, as facilitated by media software mechanism 110, digital audio messages or recordings of flowcharts, business plans, etc., may be put through a novel machine learning-based intelligence, as facilitated by software configuration engine 211, to generate or modify business software and/or design systems, including ross-referencing between various design systems. In some embodiments, this built-in intelligence may be used to warn developers of incorrect processes and recommend/guide them to use the correct ones.

There are various scenarios where a team of users are working on a project involving one or more of a potential data schema, a workflow automation process (e.g., process builder, lightening flow, etc.), a customer journey/drip campaign, etc., and the project may be written or drawn on a whiteboard or a piece of paper or simply discussed between the users. In one embodiment, any written or drawn contents may be captured by a user through media tool 222 (e.g., camera) of computing device 130A (e.g., mobile device, such as a smartphone). Similarly, any discussion may be captured by the user using media tool 222 (e.g., voice recorder) of computing device 130A (e.g., mobile device, such as a smartphone).

Visual Media

In one embodiment, the digital image captured through media tool 222 is the communicated over to media software mechanism 110 for further processes, where this communication is facilitated by communication logic 224 and communication/compatibility logic 207 over network(s) 135, such as a cloud network, the Internet. Once the digital image is received at media software mechanism 110, as facilitated by communication/compatibility logic 207, it is then uploaded by media uploading logic 213 of software configuration engine 211 as part of software configuration.

For example, in case of whiteboard data schema, this digital image may include a photo of a completed drawing of a data schema drawn on a whiteboard, etc. Similarly, the digital image may that be of workflow automation process, such as in case of whiteboard process flow, or a customer journey/drip campaign in case of whiteboard drip campaign by a team. It is contemplated that these are merely examples and that embodiments are not limited to whiteboards or backboards or paper or any type of surface. Similarly, digital images are not limited to merely still images (e.g., photographs) and that they may also include digital videos, motion pictures, etc.

As will be further described with reference to FIG. 3A, the artificial intelligence (AI)-driven software configuration engine 211 may be triggered to upload the digital image as facilitated by media uploading logic 213. Upon uploading the digital image, the digital image and its contents are analyzed by content analysis logic 215. In one embodiment, an image model image model identification (ID) is generated for the image, where the image and the image model ID are run through different processes as facilitated by content analysis logic 215.

For example, the image model ID may be put through deeper levels of image recognition and analysis using machine learning models (such as through AI-powered Einstein Vision® by Salesforce.com®) so that various sections and pieces of the image are recognized and separated. For example, contents may be searched and analyzed for alphabets, numbers, characters, etc., that they may contain along with recognizing and analyzing the image itself and its contents for visual quality and filters, band association, product affiliation, etc., that may relate to a specific user or tenant or their business model, etc.

Similarly, for example, the image is further analyzed using an optical character recognition (OCR) platform for recognition of the visual contents and subsequently conversion of such visual content into text or OCR results. This analysis of the digital image may be performed using one or more AI-based data analysis platforms, such as Google Cloud Platform (GCP).

In one embodiment, the outcome of the image and image model ID analysis is then gathered for further processing as facilitated by content mapping and sorting logic 217. For example, the breakdown of the data as part of the outcome is then reviewed and combined through mapping and sorting as facilitated by content mapping and sorting logic 217. For example, as further illustrated with respect to FIG. 3A, data obtained from processing of the image (e.g., GCP analysis) is then intelligently combined with data obtained from processing of the image model ID (e.g., Einstein vision), where this combined data is assigned blocks. As further illustrated with respect to FIG. 3B, this combined data from various blocks is then intelligently sorted and grouped, such as "test" may be mapped to "num", while "num" is mapped to "Kevin", which is mapped to "date", etc. This combination and sorting of results is based on data extracted from the digital image without any programming or input by a developer and regardless of the software design system being used for software configuration purposes.

At this stage, in one embodiment, metadata generation and feedback logic 219 is triggered to generate a set of metadata based on the combined and sorted result, where this metadata is offered to the user for review and any adjustment or feedback. For example, this metadata is generated to be consumed by the target software design system, such as using one or more OCR and object recognition and detection tools, but prior to submitting this metadata for software or system configuration, the user is prompted to review and finalize the metadata. For instance, the user may review the metadata for any errors, inaccuracies, discrepancies, etc., and then either provide feedback suggesting modifications of the metadata or approve in its current form as facilitated by metadata generation and feedback logic 219. In case of any modifications, as facilitated by metadata generation and feedback logic 219, the process may continue until the metadata is approved by the user.

Once the metadata is approved, in one embodiment, application and augmentation logic 219 is triggered to apply the metadata to the software and any software design system to offer configuration of software based on this metadata that is further based on the digital image captured using media tool 222 (e.g., digital camera) and this configuration is performed through augmentation of the software and/or design system, such as by generating or modifying the software as desired by the user though the digital image.

For example, in case of the digital image representing a new data schema, using application and augmentation logic 219, the new metadata is applied to the software and/or software design system such that, in one embodiment, this new data schema is generated from scratch and any existing data schema is replaced by the new data schema or, in another embodiment, the existing data schema is augmented to match the new data schema (such as by creating new field definitions, redefining existing field definitions, etc.).

Auditory Media

As described above, embodiments are not limited to visual media and that they are equally applicable to and workable with auditory media. For example, consider a scenario where an administrator assigns a user a profile with a set of role-based permissions for a design system. For instance, the administrator simply enters a voice query, such as "assign Jane Doe the sales user profile", and the entire sales user profile is assigned to the Jane Doe. In one embodiment, this audio message may then be used for configuration of software as facilitated by media software mechanism 110, as described above with reference to visual media.

For brevity, many of the details discussed above with reference to visual media are not repeated hereafter; however, it is contemplated that the same or similar techniques may be applied for processing of auditory media as is the case with visual media. For example, as with visual images, audio messages may be captured by media tool 222 (e.g., speaker, recorder, etc.), where an audio messages is recorded by media tool 222 and communicated over to media software mechanism 110. This audio message may then be uploaded by media uploading logic 213 for further processing.

As with visual media, in one embodiment, this audio message and its contents are analyzed by content analysis logic 215. For example, a language detection and analysis platform or tool, such as natural language processing (NLP) tool, may be used to analyze the audio message by comparing the contents of the audio message by querying against a library of supported commands or intents and carrying out the action accordingly as facilitated by content analysis logic 215. For example, certain AI-powered platforms or tools, like Einstein Voice Assistant® by Salesforce.com®, may be used to recognize and analyze the voices and sounds of the audio message and associated any relevance to such voices and sounds based on any information accessible at database(s) 140 so that this information may then be used by metadata generation and feedback logic 219 to generate a set of metadata to be used for software configuration.

In one embodiment, the analyzed content of the audio message may then be converted into text (e.g., alphabets, numbers, and characters, etc.) and, as with the visual media, the text is then mapped and sorted as facilitated by content mapping and sorting logic 217. For example, AI-based tools like Einstein Voice Assistant® may be used by content mapping and sorting logic 217 to map or sort any relevant information about the user, the profile, the command, and any other information associated with the audio message as analyzed by content analysis logic 215. For example, continuing with aforesaid scenario involving "assign Jane Doe the sales user profile", mapping and sorting logic 217 may be used to automatically and dynamically relate notes to records associated with Jane Doe and the sales user profile based on the known opportunities, accounts, contacts, customer files, sales data, etc.

Once mapped and sorted, this mapped and sorted content is then used to generate metadata that is then offered to the user for review and feedback as facilitated by metadata generation and feedback logic 219. For example, the user may review the metadata and offer any feedback, such as recommending any changes to the metadata, or simply respond by verifying and accepting the metadata and allow the process to move forward.

Once the metadata is verified, application and augmentation logic 219 is triggered to apply the metadata such that the target software and/or software design system is configured according to the metadata that is generated according to the captured audio message, which is in accordance with the user's wishes. This is accomplished without the user having to have any expertise relating to business software configuration or navigating through a series of software development screens. For example, any one or more portions of the software (e.g., certain objects, data schema, etc.) may be augmented based on the metadata or simply replaced by the new corresponding one or more portions that are generated from scratch based on the metadata.

With it be visual or auditory media, the user may generate, modify, view, etc., the software through one or more interfaces (e.g., web browser, Graphical User Interface (GUI), etc.) offered through one or more software design system(s) 220. It is contemplated and as referenced above, in some embodiment, configuration is applied to or any changes are made directly to design system(s) 220 accessible to the user, where the re-configured design system(s) 220 are then used to generate the software as desired by the user and represented through visual and/or auditory media.

For example, there are various design systems available today for developers to use; however, each design system is based on its own protocols and preferences, which makes it not only trend differently from other design systems, but also develop incompatibility with such design systems. This leaves developers, such as user interface (UI) developers, at a great disadvantage, such as when they may be required to work with as many as twenty different design systems, often simultaneously, to develop their product. This reduces productivity since these developers could be working with components that leverage varying design systems. For example, SLDS and Trailhead Design Systems (TDS) are but only two of the design systems offered by Salesforce.com® for markup structure and styling guideline for lightning and markup structure and styling guideline for Salesforce Trailhead, respectively.

As aforesaid, any number or type of platforms or tools, such as OCR, object recognition/detection tools, NLP tools, etc., may be used to work with media software mechanism 110 and its software configuration engine 211 to provide for this novel technique to effectively drive business efficiency though the rapid configuration and iteration of enterprise software. This novel technique allows for reduction in barrier to administrating complex enterprise software and improving productivity and agility for users in the same regard, while enabling the implementation of a smart feedback/disambiguation tool, as facilitated by metadata generation and feedback logic 219, to achieve maximum accuracy, while keep the user engaged in the process without having the user to carry out any of the tedious tasks. For example, on the client side, such as at client device 130A, a user (e.g., developer) may access and view the metadata and one or more software design systems through design system(s) 220.

Further, with respect to visual media, digital images may be captured using native application programming interfaces (APIs), such as mobile APIs, as provided through media tool 222 (e.g., digital camera, etc.) at client device 130A (e.g., mobile device, such as smartphone, tablet, smartwatch, wearable device, etc.) that may then be saved at client device 130A or elsewhere (e.g., cloud storage, external hard-drive, etc.) and subsequently uploaded to server device 120 for processing by media software mechanism 110. These digital images may then be processed independently by, for example, one or more of an OCR platform and an object recognition/detection platform, etc., where the results may then be correlated using x-y bounding coordinates returned by the two result sets associated with the OCR platform and the recognition/detection platform, as further illustrated with respect to FIG. 3A. This is processed algorithmically and fed into API endpoints in the destination system.

Figure 3A:
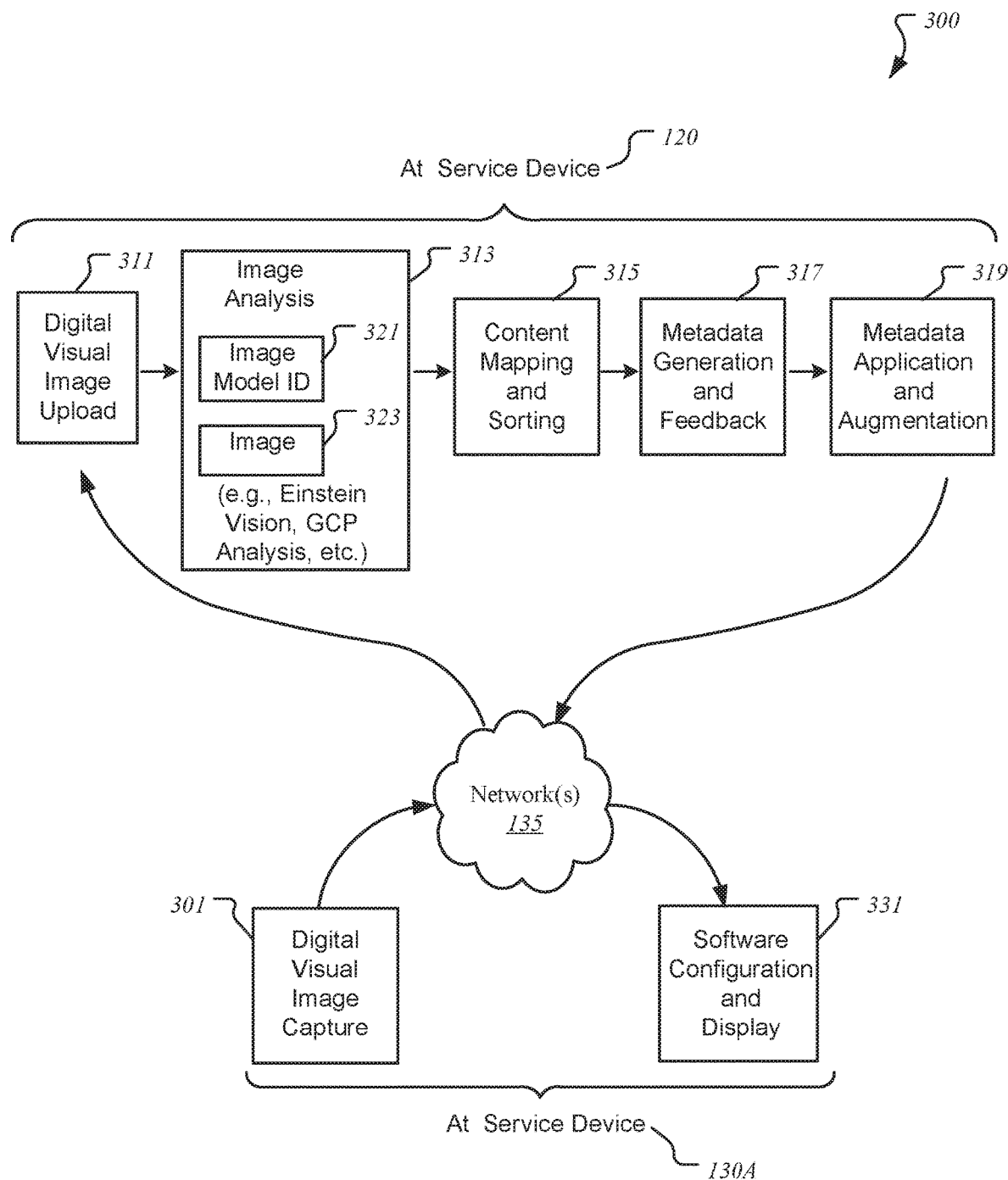
FIG. 3A illustrates an architectural transaction sequence for visual media metadata-based software configuration according to one embodiment according to one embodiment.
Figure 3B:
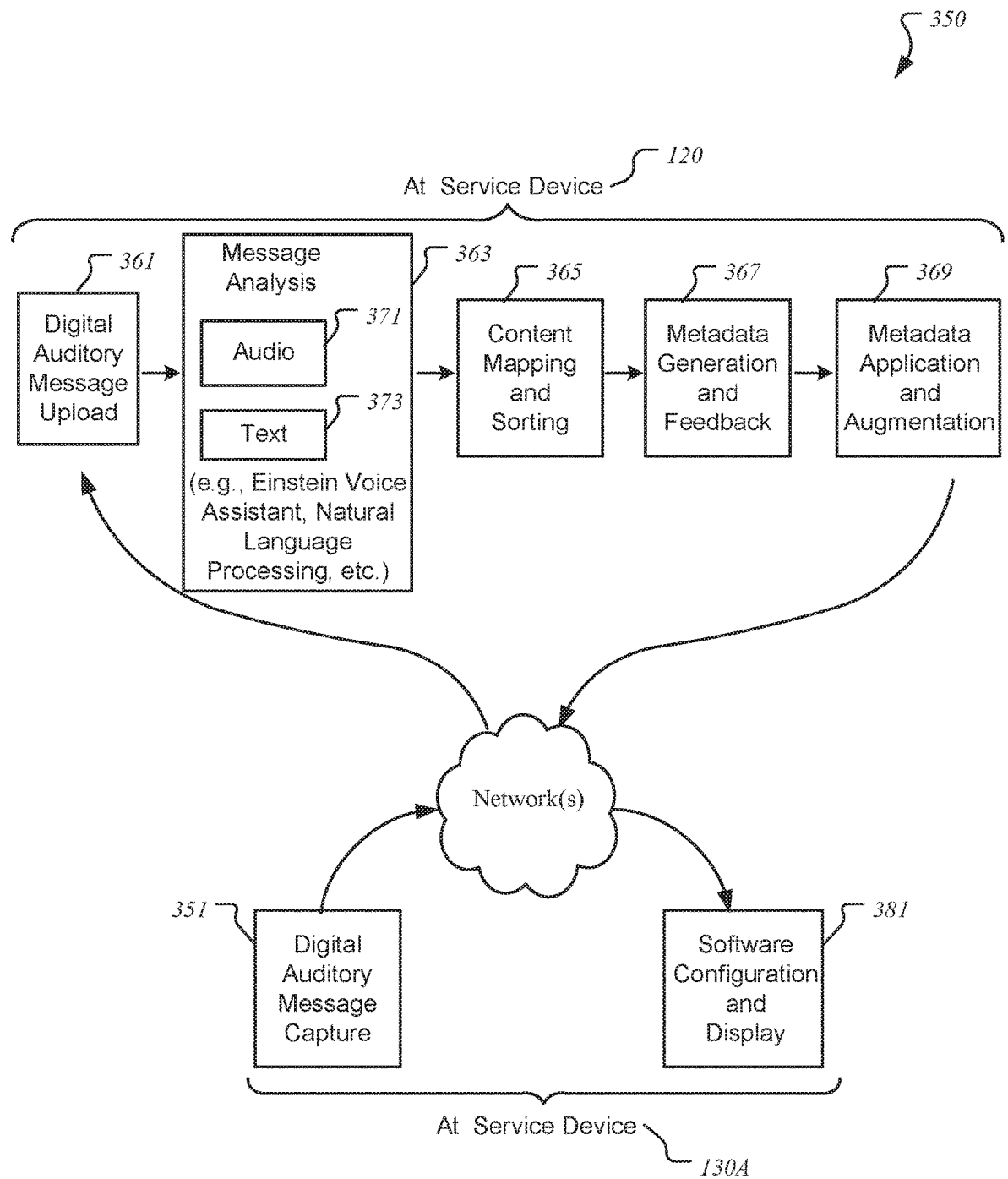
FIG. 3B illustrates an architectural transaction sequence for auditory media metadata-based software configuration according to one embodiment according to one embodiment.

Similarly, with respect to auditory media, as further illustrated with respect to FIG. 3B, any audio messages, such as voice-based messages or queries are converted to text with, for example, native operating system APIs (e.g., iOS speech recognition API, etc.). In one embodiment, this text is then processed using, for example, an NLP platform with trained intents, where the resultant intent and extracted entities are then fed into API endpoints in the destination system.

As mentioned previously, it is contemplated that queries may include any number and type of requests seeking responses for processing jobs, running reports, seeking data, etc. These queries are typically placed by users on behalf of tenants, using client device 130A. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from media software mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

FIG. 3A illustrates a transaction sequence 300 for visual media metadata-based software configuration according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by one or more components of media software mechanism 110 of FIG. 1. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

As illustrated and described above with reference to FIG. 2, digital visual image is captured at 301 at client device 130A, where, for example, a camera of media tool 222 may be used to capture a digital photograph or video of data, such as a flow chart, a business plan, suggestions on changes to a business software application, etc., where this data may be hand-drawn on a whiteboard, a blackboard, a paper, or printed on a paper, etc. Embodiments are not limited to any type of surface or camera or how the data is presented, captured, and/or recorded.

In this case of visual media, the digital image is received at a server device and upload at 311 for further processing. At block 313, as further described with reference to FIG. 2, the digital image itself and its contents are analyzed at 315 using one or more AI-based data analysis techniques and platforms, such as using techniques and/or platforms offered through Einstein Vision® by Salesforce.com®, GPC analysis, etc., where image model ID 321 and image 323 are processed through machine learning for parsing and analysis of its contents and features. In some embodiments, any known information (such as any data relevant to image 323, a user or a tenant association with image 323, any portion of contents captured by image 323, etc.) is accessed at one or more databases, such as database(s) 140, and associated with image 323 and its contents for smarter and better generation of metadata.

At 315, the analyzed portions of the contents are mapped with each other and, as necessary, sorted in an order that is helpful in generating the metadata. In one embodiment, at 317, the metadata is generated and offered to the user for review and verification. If the user is not content with the metadata, such as due to inaccuracies, errors, discrepancies, etc., the user may offer feedback with proposed modifications of the metadata, where the metadata is then updated or revised based on the user feedback. If, or when, the user is satisfied with the metadata, the user may then approve it through the feedback. Once the user approval is received, at 319, the metadata is applied and any corresponding augmentation for software and/or software design system is triggered. It is contemplated that embodiments are not limited to user approval or feedback and that in some embodiments, user approval or feedback may not be necessitated and that any generated metadata may be proceeded with its application for software configuration.

Once applied, one or more portions (e.g., dynamic objects, static objects, etc.) of the target software and/or one or more components (e.g., number of times a loop is performed, data verification prior to running software, etc.) of the target software design system are altered or augmented based on the metadata. For example, in one embodiment, certain portions or components may be newly generated and added to the software or design system, respectively, while, in another embodiment, the newly generated portions of components may be used to substitute their corresponding existing portions or components associated with the software or design system, respectively. In one embodiment, at 331, the configured software and/or design system are offered or displayed to the user through one or more user interfaces offered by software design system(s) 220 at client device 130A of FIG. 2.

FIG. 3B illustrates a transaction sequence 350 for auditory media metadata-based software configuration according to one embodiment. Transaction sequence 350 may be performed by processing logic that may comprise hardware (e.g., circuitry, dedicated logic, programmable logic, etc.), software (such as instructions run on a processing device), or a combination thereof. In one embodiment, transaction sequence 350 may be performed or facilitated by one or more components of media software mechanism 110 of FIG. 1. The processes of transaction sequence 350 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3A may not be repeated or discussed hereafter.

As illustrated and described above with reference to FIG. 2, digital auditory message is captured at 351 at client device 130A, where, for example, a microphone and recording tool of media tool 222 may be used to capture a digital audio message of data, such as a profile or task assignment to an employee, flow chart process details, a business plan, suggestions on changes to a business software application, etc., where this data may be spoken during a meeting by one or more individuals (e.g., developers, engineers, programmers, etc.) or played on another machine (e.g., digital or analog media player). Embodiments are not limited to any type of capturing or recording tool or how the data is communicated, captured, and/or recorded.

In this case of this auditory media, the audio message is received at a server device and upload at 361 for further processing. At block 363, as further described with reference to FIG. 2, the digital message itself and its contents are analyzed at 363 using one or more AI-based data analysis techniques and platforms, such as using techniques and/or platforms offered through Einstein Voice Assistant® by Salesforce.com®, NLP analysis platform, etc., where audio 371 is processed through machine learning for parsing and analysis of its contents and features and then converted into text 373 (e.g., text, numbers, characters, etc.). Further, in some embodiments, any known information (such as any data relevant to audio 371, a user or a tenant association with audio 371, any portion of contents captured by audio 371, etc.) is accessed at one or more databases, such as database(s) 140, and associated with audio 371 and its contents for smarter and better generation of metadata.

At 365, the analyzed portions of the contents are mapped with each other and, as necessary, sorted in an order that is helpful in generating the metadata. In one embodiment, at 367, the metadata is generated and offered to the user for review and verification. If the user is not content with the metadata, such as due to inaccuracies, errors, discrepancies, etc., the user may offer feedback with proposed modifications of the metadata, where the metadata is then updated or revised based on the user feedback. If, or when, the user is satisfied with the metadata, the user may then approve it through the feedback. Once the user approval is received, at 369, the metadata is applied and any corresponding augmentation for software and/or software design system is triggered. It is contemplated that embodiments are not limited to user approval or feedback and that in some embodiments, user approval or feedback may not be necessitated and that any generated metadata may be proceeded with its application for software configuration.

Once applied, one or more portions (e.g., dynamic objects, static objects, etc.) of the target software and/or one or more components (e.g., number of times a loop is performed, data verification prior to running software, etc.) of the target software design system are altered or augmented based on the metadata. For example, in one embodiment, certain portions or components may be newly generated and added to the software or design system, respectively, while, in another embodiment, the newly generated portions of components may be used to substitute their corresponding existing portions or components associated with the software or design system, respectively. In one embodiment, at 381, the configured software and/or design system are offered or displayed to the user through one or more user interfaces offered by software design system(s) 220 at client device 130A of FIG. 2.

Figure 4A:
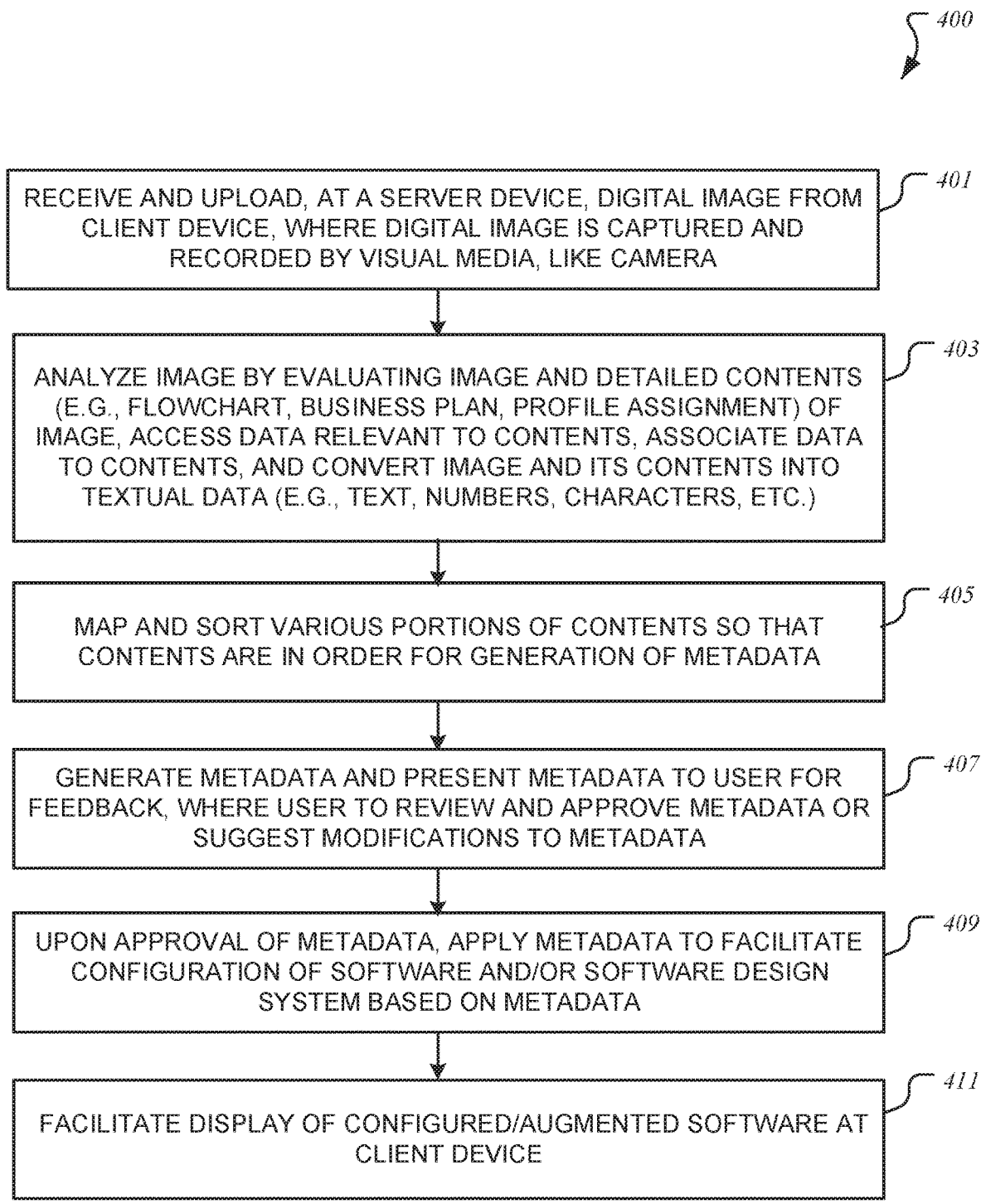
FIG. 4A illustrates a method for visual media metadata-based software configuration according to one embodiment according to one embodiment.

FIG. 4A illustrates a method 400 for visual media metadata-based software configuration according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of media software mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3B may not be repeated or discussed hereafter.

Method 400 begins at block 401 with receiving and uploading of a digital image at a server device, where the digital image is received from a client device over a network (e.g., cloud network, Internet, etc.), where the digital image is captured and recorded using a media device, such a camera, coupled to the client device. At block 403, the uploaded digital image is analyzed by evaluating the image and detailed contents (e.g., flowchart, business plan, profile assignment, etc.) associated with the image, accessing data relevant to the contents, associate the data to the contents, and converting the image and its contents into textual data (e.g., text, numbers, characters, etc.).

At block 405, various portions of the contents are mapped and sorted with each other so that the contents are ready for generation of metadata. At block 407, the metadata is generated and presented to the user for feedback, where the user can review the metadata and offer feedback suggesting modifications to the metadata or approval of the metadata in its current form. At block 409, upon approval of the metadata, the metadata is applied to facilitate configuration of software and/or software design system based on the metadata. At block 411, the configured/augmented software and/or software design system is displayed to the user using a display device coupled to the client device.

Figure 4B:
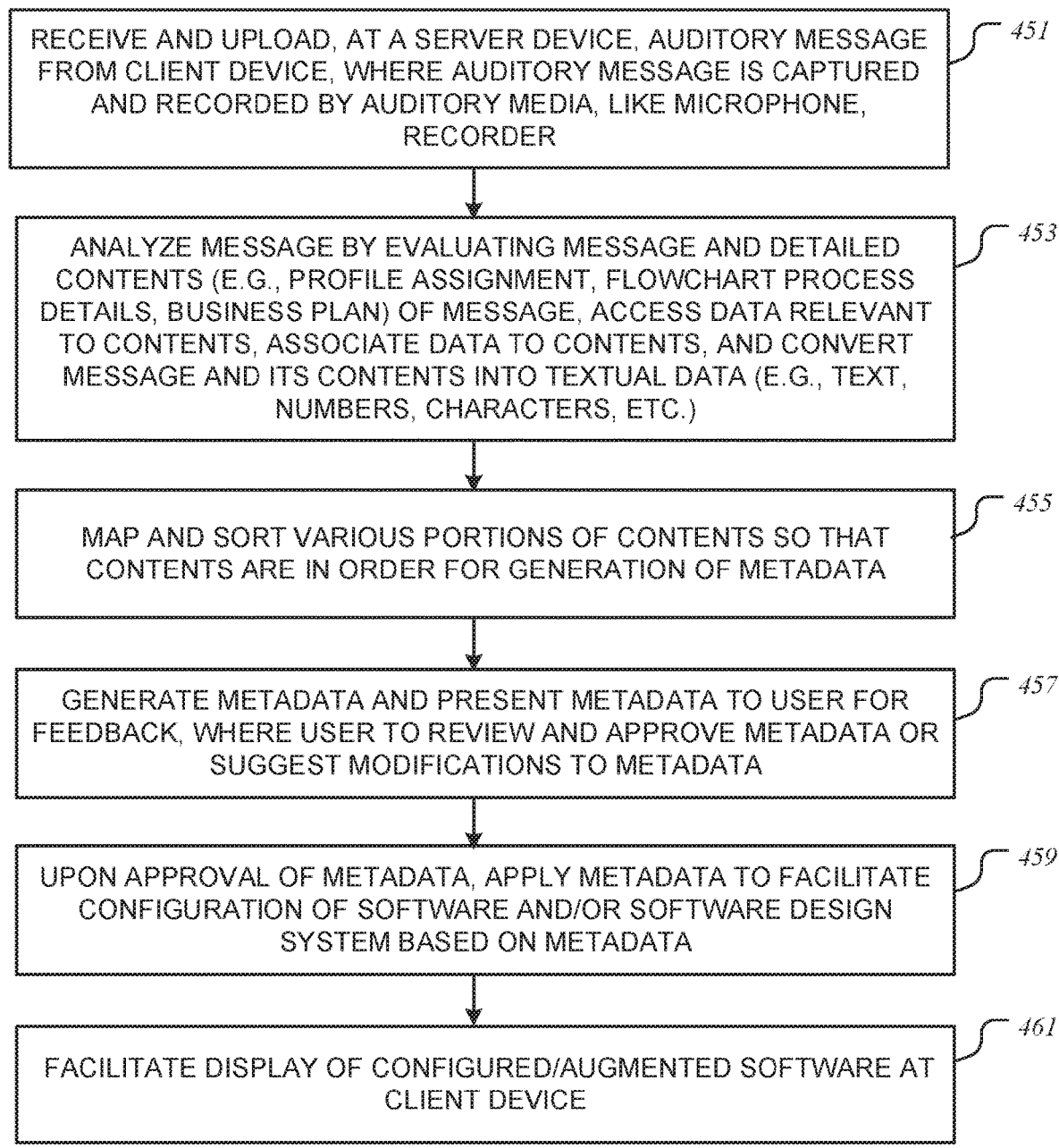
FIG. 4B illustrates a method for auditory media metadata-based software configuration according to one embodiment according to one embodiment.

FIG. 4B illustrates a method 450 for auditory media metadata-based software configuration according to one embodiment. Method 450 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of media software mechanism 110 of FIG. 1. The processes of method 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4A may not be repeated or discussed hereafter.

Method 450 begins at block 451 with receiving and uploading of a digital audio message at a server device, where the digital audio message is received from a client device over a network (e.g., cloud network, Internet, etc.), where the audio message is captured and recorded using a media device, such a microphone, media recorder, etc., coupled to the client device. At block 453, the uploaded digital message is analyzed by evaluating the image and its detailed contents (e.g., profile assignment, flowchart processes, business plan, etc.) associated with the message, accessing data relevant to the contents, associating the data to the contents, and converting the audio message and its contents into textual data (e.g., text, numbers, characters, etc.).

At block 455, various portions of the contents are mapped and sorted with each other so that the contents are ready for generation of metadata. At block 457, the metadata is generated and presented to the user for feedback, where the user can review the metadata and offer feedback suggesting modifications to the metadata or approval of the metadata in its current form. At block 459, upon approval of the metadata, the metadata is applied to facilitate configuration of software and/or software design system based on the metadata. At block 461, the configured/augmented software and/or software design system is displayed to the user using a display device coupled to the client device.

Figure 5:
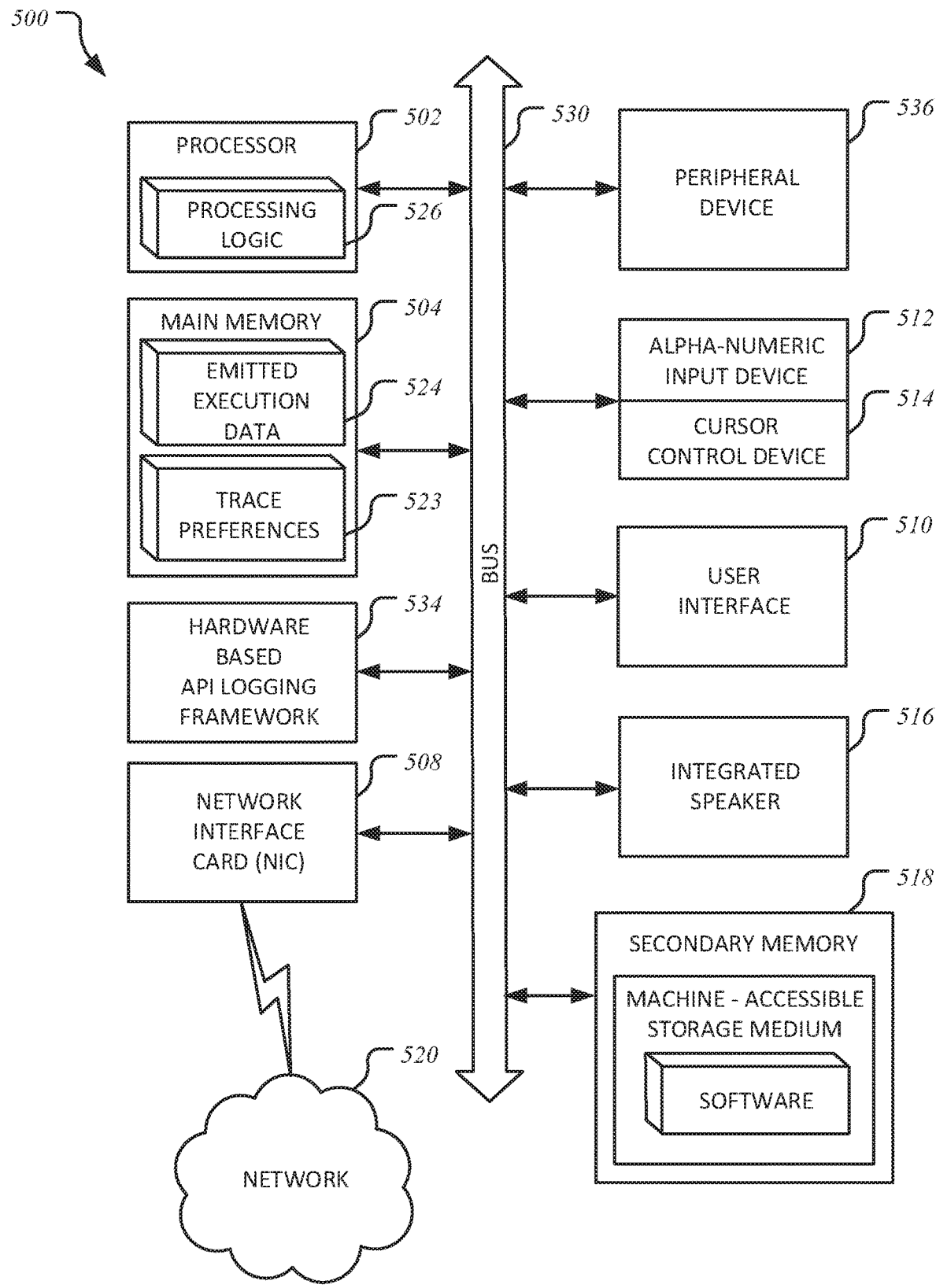
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of generic IDE extension mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of generic IDE extension mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
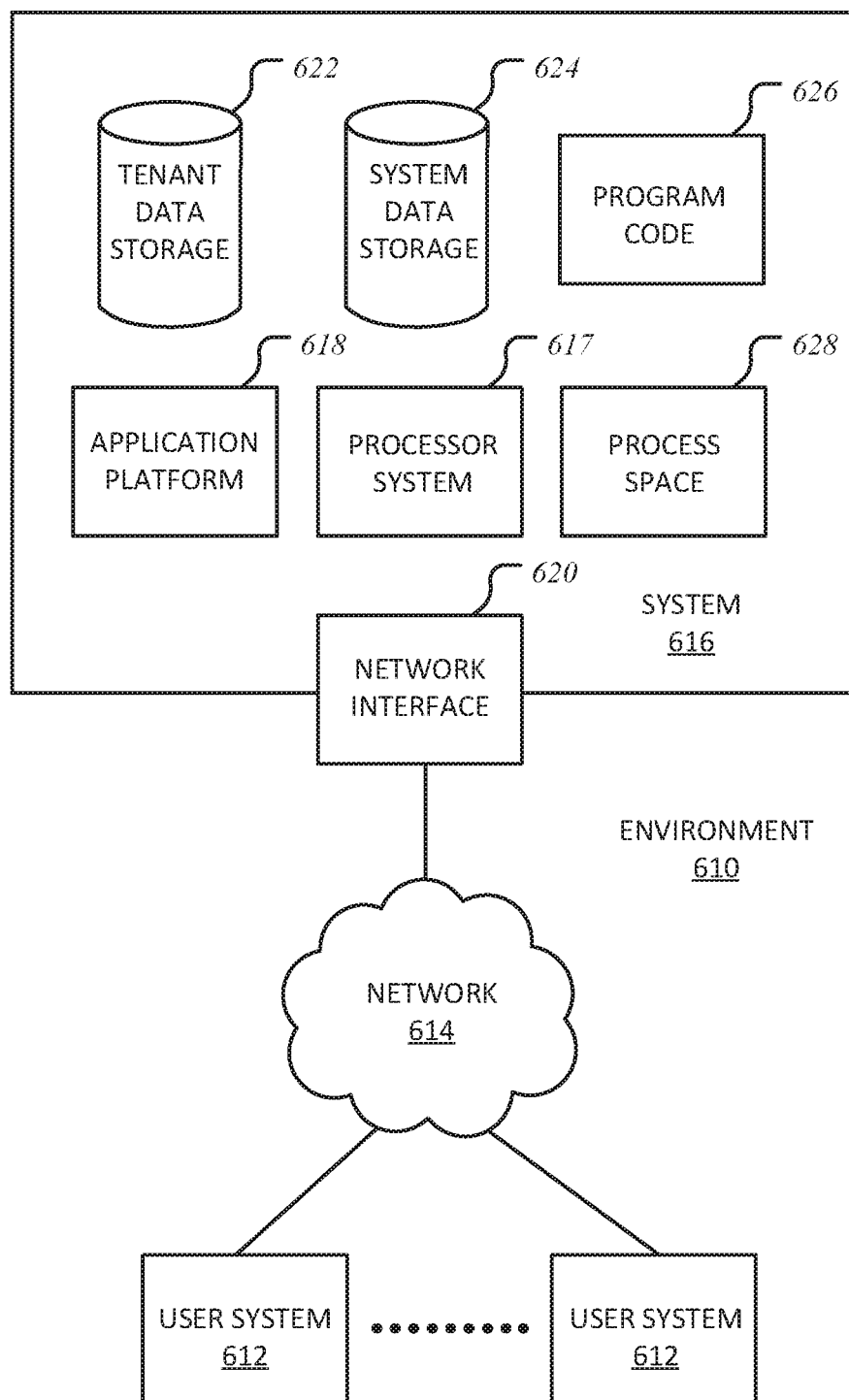
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
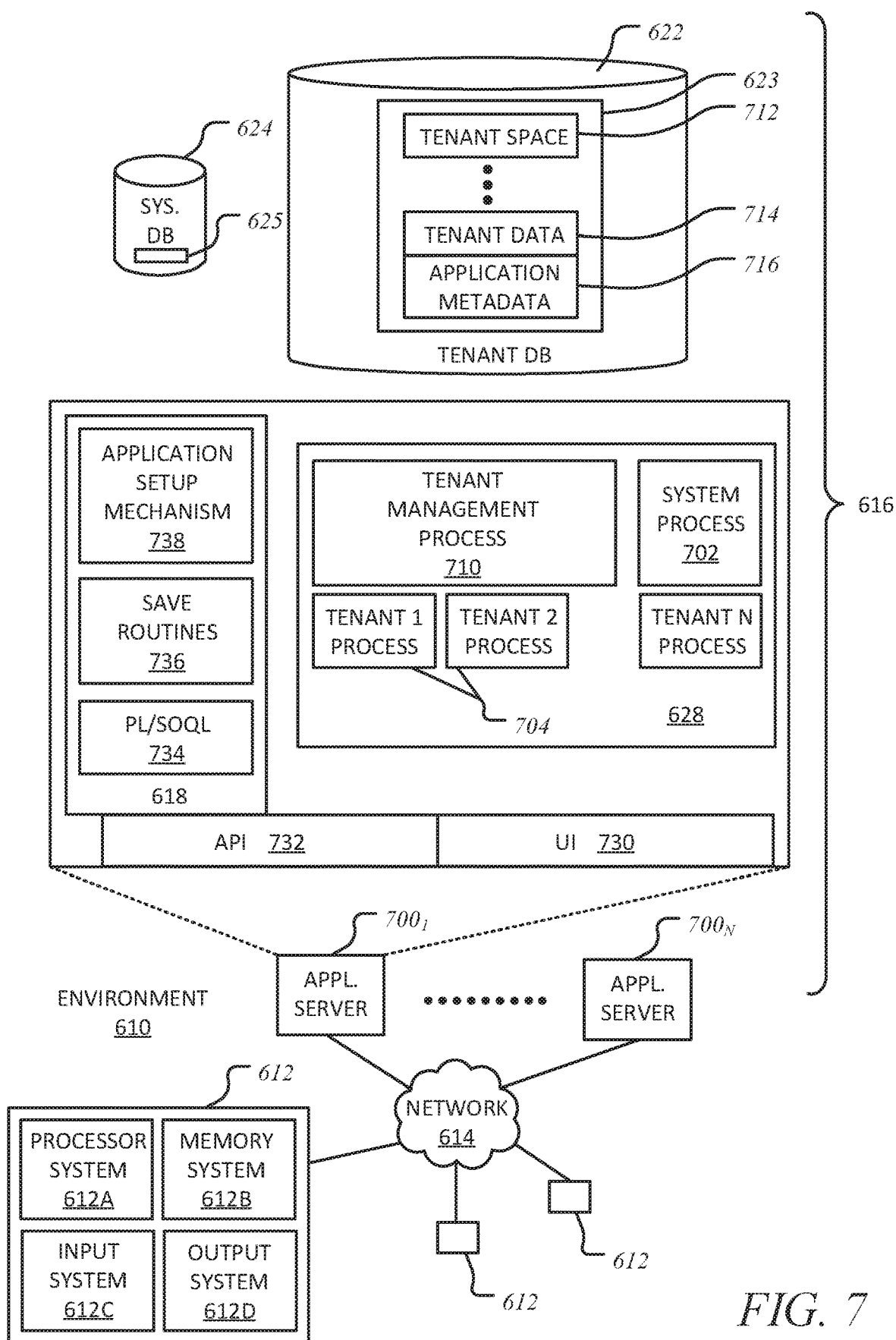
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
capturing, via an image capturing device, an image of contents including a schema representing updates to software application accessible to a user, wherein the contents are recorded on and captured from one or more surfaces including one or more of a paper, a whiteboard, or a display screen;
translating the schema into metadata that is compatible with multiple software design systems;
generating, based on the metadata, a component bundle including configuration criteria for updating the software application, wherein the component bundle is compatible with the software application and translated into one or more structures such that a component tree is constructed based on the one or more structures and analyzed based on one or more of static analysis, expression analysis, or structure hierarchy analysis; and
configuring the software application based on the component tree such that one or more objects of the software application are updated to enhance one or more performance factors relating to the software application.

2. The method of claim 1, further comprising:
uploading the visual image at a server computing device, wherein the visual image is received from a client computing device over a communication network; and
analyzing the visual image and the contents using one or more image analysis techniques.

3. The method of claim 2, further comprising:
mapping and sorting multiple portions of the contents according to data relating to the contents of the visual image; and
generating metadata based on the contents and presenting the metadata to a user via the client computing device for feedback; and
approving or revising the metadata based on the feedback.

4. The method of claim 1, further comprising displaying and offering access to the configured software application using one or more user interfaces, wherein the image capturing device includes a camera.

5. The method of claim 4, wherein the one or more user interfaces comprise one or more of a graphical user interface (GUI), a web browser, an application-based interface, and an application programming interface (API).

6. A database system comprising:
a server computing device having a processing device and a storage device having instructions, the processing device to execute the instructions to perform operations comprising:
capturing, via an image capturing device, an image of contents including a schema representing updates to software application accessible to a user, wherein the contents are recorded on and captured from one or more surfaces including one or more of a paper, a whiteboard, or a display screen;
translating the schema into metadata that is compatible with multiple software design systems;
generating, based on the metadata, a component bundle including configuration criteria for updating the software application, wherein the component bundle is compatible with the software application and translated into one or more structures such that a component tree is constructed based on the one or more structures and analyzed based on one or more of static analysis, expression analysis, or structure hierarchy analysis; and
configuring the software application based on the component tree such that one or more objects of the software application are updated to enhance one or more performance factors relating to the software application.

7. The database system of claim 6, wherein the operations further comprise:
uploading the visual image at a server computing device, wherein the visual image is received from a client computing device over a communication network; and
analyzing the visual image and the contents using one or more image analysis techniques.

8. The database system of claim 7, wherein the operations further comprise:
mapping and sorting multiple portions of the contents according to data relating to the contents of the visual image; and
generating metadata based on the contents and presenting the metadata to a user via the client computing device for feedback; and
approving or revising the metadata based on the feedback.

9. The database system of claim 6, wherein the operations further comprise displaying and offering access to the configured software application using one or more user interfaces, wherein the image capturing device includes a camera.

10. The database system of claim 9, wherein the one or more user interfaces comprise one or more of a graphical user interface (GUI), a web browser, an application-based interface, and an application programming interface (API).

11. A non-transitory computer-readable medium having stored thereon instructions which, when executed, cause a computing device to perform operations comprising:
capturing, via an image capturing device, an image of contents including a schema representing updates to a software application accessible to a user, wherein the contents are recorded on and captured from one or more surfaces including one or more of a paper, a whiteboard, or a display screen;
translating the schema into metadata that is compatible with multiple software design systems;
generating, based on the metadata, a component bundle including configuration criteria for updating the software application, wherein the component bundle is compatible with the software application and translated into one or more structures such that a component tree is constructed based on the one or more structures and analyzed based on one or more of static analysis, expression analysis, or structure hierarchy analysis; and
configuring the software application based on the component tree such that one or more objects of the software application are updated to enhance one or more performance factors relating to for future updated performance by the software application.

12. The non-transitory computer-readable medium of claim 11, wherein the operations further comprise:
uploading the visual image at a server computing device, wherein the visual image is received from a client computing device over a communication network; and
analyzing the visual image and the contents using one or more image analysis techniques.

13. The non-transitory computer-readable medium of claim 12, wherein the operations further comprise:
mapping and sorting multiple portions of the contents according to data relating to the contents of the visual image; and
generating metadata based on the contents and presenting the metadata to a user via the client computing device for feedback; and
approving or revising the metadata based on the feedback.

14. The non-transitory computer-readable medium of claim 11, wherein the operations further comprise displaying and offering access to the configured software application using one or more user interfaces, wherein the image capturing device includes a camera.

15. The non-transitory computer-readable medium of claim 14, wherein the one or more user interfaces comprise one or more of a graphical user interface (GUI), a web browser, an application-based interface, and an application programming interface (API).

* * * * *